United States Patent Office 2,797,780
Patented July 2, 1957

2,797,780

ANTI-CREEP BRAKE AND GEAR PHASER FOR AN AUTOMATIC TRANSMISSION

Ernest E. Wemp, deceased, late of Detroit, Mich., by Lila A. Wemp, Detroit, and William O'Neill Kronner, Grosse Pointe, Mich., executors Original application January 4, 1951, Serial No. 204,330, now Patent No. 2,689,030, dated September 14, 1954. Divided and this application July 14, 1954, Serial No. 443,332

15 Claims. (Cl. 192—3)

This invention relates to an automatic transmission for an automotive vehicle and especially to a transmission which employs a hydraulic torque converter. This application is a division of application Serial. No. 204,330 filed January 4, 1951 titled "Actuator Mechanism for Power Coupler" now Patent No. 2,689,030 issued September 14, 1954.

A transmission which embodies a hydraulic coupling, such as a hydraulic torque converter, has the characteristic of causing the vehicle to creep as the engine is idling and relatively light torque is delivered by the engine to the traction wheels through the hydraulic torque converter. An object of the invention is to provide a novel arrangement in an anti-creep brake which is automatically applied to hold the vehicle against such creeping when the engine is idling.

The brake is automatically released when the operator depresses the throttle control to accelerate the engine for movement of the vehicle. This brake construction and its actuating means serves also as a parking brake since it is automatically applied if the vehicle be left standing or is parked. The brake likewise is arranged to serve as a gear phaser. This function may take place for example when the engine is running at an idling speed and the driver wishes to cause a dental engagement in the transmission for establishing either a forward or a reverse drive. It may be that the teeth to be engaged meet each other end to end and some element must be rocked or partially rotated to disalign the teeth.

The anti-creep brake may also function to relieve the load on teeth in the transmission so that they may be disengaged. This is accomplished by associating the service brake system of the vehicle with the anti-creep brake. Suppose, for example, the vehicle is parked on an incline and the anti-creep brake is holding the vehicle and torque is transmitted from the driving wheels through the transmission. The load on the dentally engaged teeth prevents their release. When the service brakes are applied the wheels of the vehicle are frozen in position and the hydraulic pressure of the service brake system serves to release or partially release the anti-creep brake. This relieves the torsional wind up in the system through the transmission and dentally engaged teeth and, therefore, the dentally engaged teeth may be disengaged.

Figure 1:
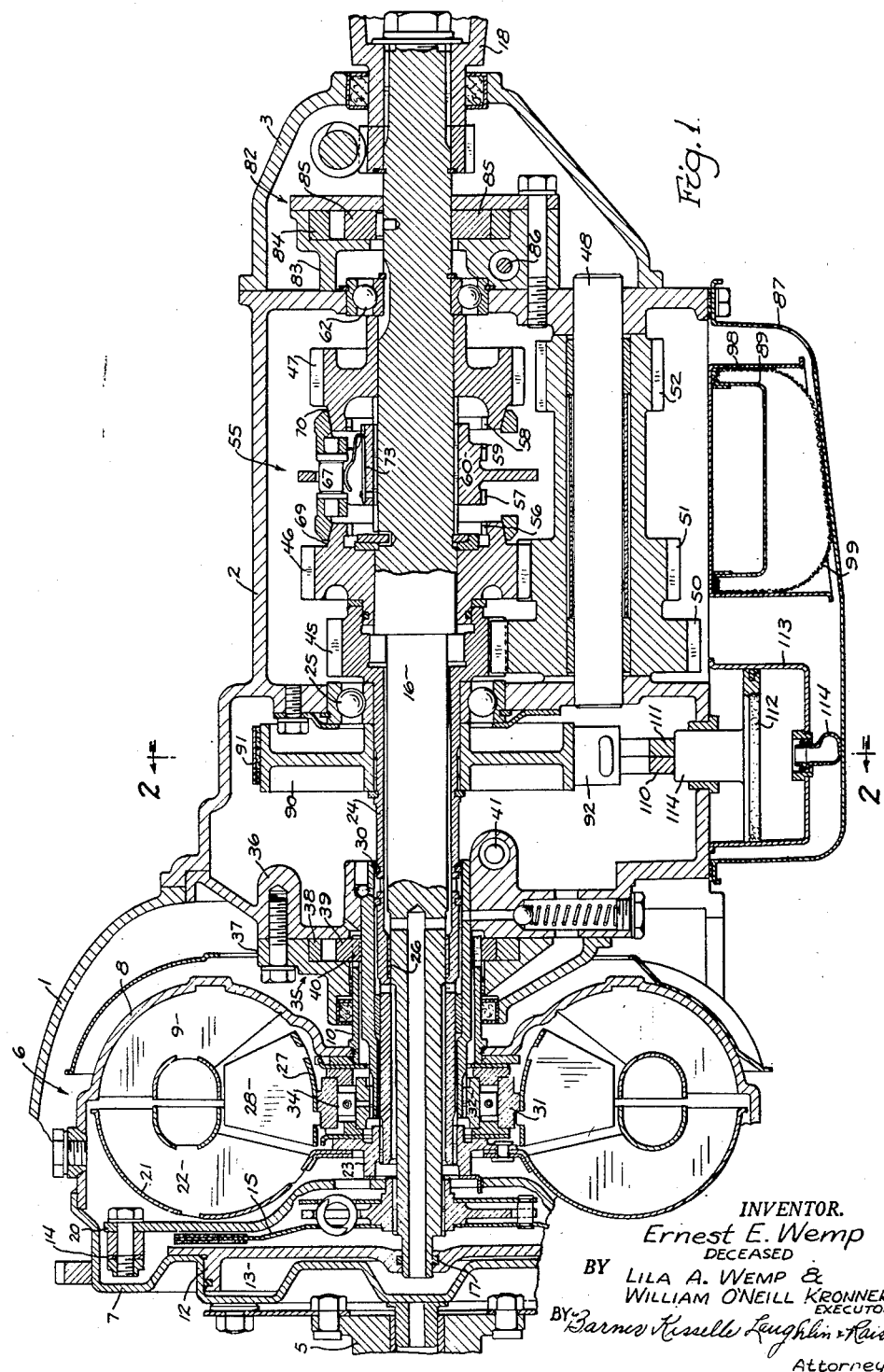
Fig. 1 is a general cross sectional view illustrating the torque converter, the transmission gearing and the clutch.

The transmission as shown in Fig. 1 has a housing section 1 for a torque converter, an intermediate housing 2 for gearing of the range change section, and an end housing member 3. The crank shaft of an engine is shown at 5. It is drivingly connected with the impeller or driving member of a hydraulic torque converter, generally shown at 6, having a forward plate 7 and a rear wall 8 provided with vanes 9. The rear wall 8 constitutes a part of the torus chamber and the rear wall has a projecting hub portion 10.

The front plate 7 is formed to provide a cylinder for receiving the piston portion of a clutch pressure plate 12, the defined cylinder space being shown at 13. The pressure plate is drivingly connected to the engine as at 14. A clutch driven disc 15 has its hub drivingly connected to a clutch shaft 16. This clutch shaft has its forward end piloted as at 17 in the pressure plate 12 and it extends through the transmission and has a final drive member 18 at its rear end which may be one of the members of a universal joint coupling. A drive shaft, not shown, extends from the coupling 18 to the driving wheels of a vehicle. Connected to the plate 7, and disposed on the opposite side of the clutch driven disc is a clutch driving member 20.

The turbine or driven member of the hydraulic torque converter has a wall 21 with vanes or blades 22 and this member has its hub 23 drivingly mounted on a sleeve 24. This sleeve projects into the transmission housing 2 and is journalled in a bearing 25, there being also a bearing 26 between the sleeve and the clutch shaft. The stator of the torque converter has a wall 27 with vanes or blades 28. The stator is mounted on a fixed sleeve 30 through the means of a one-way drive coupling 34. This one way drive means or overrunning clutch arrangement may be of the sprag type. It permits the stator to rotate in one direction only (forward) but it cannot operate in the opposite direction (backward) as the sleeve 30 is fixed from the standpoint that it is not rotatable.

There is a partition between the housing sections 1 and 2 constituted by a plate 36 and a plate 37 which cooperate to provide a pump chamber. The pump is generally shown at 35. Within this chamber is a rotary type of pump having an outer member 38 and an inner member 39 and the inner member is keyed or splined to the sleeve 10 as shown at 40. Thus it will be seen that this pump, conveniently called the front pump is driven directly by the engine.

This type of torque converter is known to those skilled in the art. As the engine operates hydraulic medium, which may hereafter be termed oil, is pumped into the torus chamber by the pump and circulated therethrough and the impeller 8 drives the turbine 21 and torque is transmitted by the sleeve 24. At low speeds and at high torque the stator tends to rotate reversely which it cannot do because it is held by the one way drive coupling and the sleeve 30. The stator vanes so change the velocity angle of the oil that there is a torque conversion in that the engine operates at a higher R. P. M. than the sleeve 24 and a higher torque is transmitted to the sleeve 30 since torque or speed are reciprocal. However, as the speed increases and the speed of rotation of the turbine approaches that of the impeller the reaction on the stator blades diminishes and finally the stator merely idles and rotates in the direction of rotation of the impeller and turbine and performs no further function in changing the direction of the velocity flow of the oil. When this condition exists the impeller and turbine act essentially as a fluid coupling and are rotating without torque conversion and substantially at the same speed of rotation less that which is unavoidably present in a hydraulic coupling of this type.

In the range change section of the transmission is a gear 45 which may be integral with the sleeve 24. A gear 46 is journalled on the clutch shaft 16 and a gear 47 also journalled on the shaft 16. There is a countershaft 48 with a gear cluster journalled thereon including a gear 50 the teeth of which mesh with those of gear 45, a gear 51, the teeth of which mesh with those of gear 46 and a reverse gear 52. The teeth of the reverse gear 52 mesh with the teeth of an idler gear, not shown, and the teeth of the idler gear mesh with those of gear 47.

The gears 46 and 47 are spaced apart and between them lies a power coupler generally illustrated at 55. The gear 46 is provided with a set of internal teeth 56 for dental engagement with teeth 57 on the coupler. The gear 47 is provided with a set of internal teeth 58 for dental engagement with a set of teeth 59 on the coupler. The body or hub of the coupler 60 is slidably splined to the clutch shaft as indicated. As aforesaid, the clutch shaft extends out through the rear of the transmission and it is carried by a suitable bearing 62.

Before proceeding with further description the general operation may be referred to. In the low range, the coupler 55 is shifted to the left and coupled with the gear 46. Accordingly, with the clutch disengaged the torque converter functions to transmit torque to the turbine thence to the sleeve 24 and gear 45. This torque is transmitted through the gears 50 and 51 to the gear 46, thence to the coupler and to the clutch shaft. The torque converter may function to transmit torque starting from a very low speed ratio between the engine and the shaft 16 and a higher torque ratio and when conditions are such that the stator ceases to function as such and begins to idle, the torque is then transmitted through the fixed reduction provided by the gear train. At this time the gear train determines the relative speed and torque ratio except for the unavoidable slip in the hydraulic converter which is functioning at the time as a fluid coupling. Following this the clutch comprising parts 12, 15 and 20 is to be engaged and after engagement the torque is then transmitted directly to the shaft 16 and at this time the coupler 55 is disengaged from the gear 46. Also at this time, the turbine 21, the sleeve 24, the gears 45 and 46, and the gear cluster, merely rotate in an idling fashion in the sense that no torque is transmitted therethrough except that necessary to overcome what little friction is present. When the coupler 55 is shifted to the right as Fig. 1 is viewed, to engage the teeth 58 and 59, the shaft 16 is driven in the reverse direction for the purpose of backing up the vehicle. In this case the torque is transmitted through the converter and the clutch is disengaged.

The power coupler is of the type shown in Pat. No. Re. 22,761 of May 28, 1946 and in Pat. No. 2,441,174 of May 11, 1948 and probably needs only a general disclosure herein. The coupler is shifted by shifting means, not shown, applied to the flange.

The teeth 56 and 57 are helically disposed so that normally when torque is transmitted therethrough from the engine to the shaft 16, the angle of the teeth tend to hold the teeth in engagement with each other. On reversal of torque, however, that is, when torque is delivered from the shaft 16 and into the gear train, the inclined or helical teeth tend to reject the coupler or, in other words, tend to shift the teeth out of dental engagement. This tendency will not cause disengagement, however, in normal operation.

There is another pump 82 for hydraulic medium which is driven by the shaft 16. This pump is shown as being located in the housing section 3 and it has a housing 83 with a pump member 84 and a pump member 85 which is drivingly connected with the shaft 16. The pump has a suitable pressure relief valve shown at 86. This may be termed the rear pump.

The transmission case is provided with a bottom closure or pan 87 which constitutes a sump for the oil and the two pumps have a common inlet conduit or passageway (not shown) communicating into the sump. There is a screen 89 in the sump into which the inlet communicates. The screen is covered by a downwardly opening shell 98 to prevent oil surge. The lower end of the shell is spaced from the bottom of the pan so that oil may freely enter. The screen is held in place by a spring 99 which seats on the bottom of the pan 87.

Figure 2:
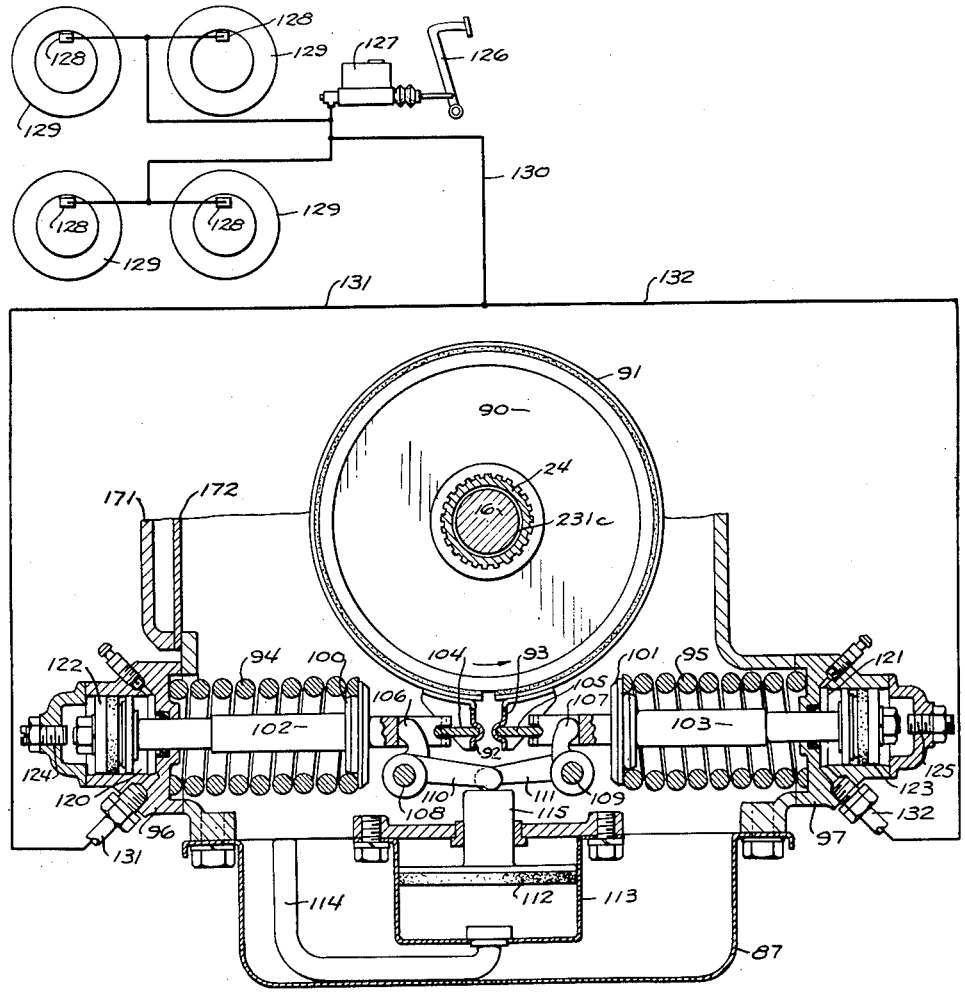
Fig. 2 is an enlarged cross sectional view taken substantially on line 4—4 of Fig. 1 showing the anti-creep brake.

There is an anti-creep brake applicable to a torque transmitting member for restraining the vehicle against creeping action when the engine is idling. This takes the form of a brake member or disc 90 splined or otherwise attached to the sleeve 24 and a brake band 91. The structure is shown in Fig. 4. Each end of the brake band is provided with an end piece or ear 92 and 93 and there are two oppositely acting springs 94 and 95 backed up by spring seats 96 and 97 which tend normally to wrap the brake band on the disc. Heads 100 and 101 mounted on rods 102 and 103 transmit the thrust of the springs through struts 104 and 105 which engage the end pieces or ears 92 and 93. The rods 102 and 103 are bifurcated, each for receiving one end 106 and 107 of bell cranks pivoted as at 108 and 109 and each having an arm 110 and 111. A piston 112 in a cylinder 113, to which oil under pressure may be pumped through conduit 114, has a projecting part 115 for engaging the arms 110 and 111 as indicated. If oil under pressure is introduced into the cylinder the piston moves upwardly as Fig. 2 is viewed, the bell cranks are swung on their pivots and the springs are compressed and the load thereby relieved from the brake band to release the brake. If the cylinder is vented or opened to an exhaust the springs expand and the brake is applied. Each spring seat has a cylinder formed therein as shown at 120 and 121 and each rod has a piston mounted thereon and positioned in these cylinders as shown at 122 and 123. The springs can only be compressed to the point where the rods abut adjustable stops 124 and 125.

Figure 3:
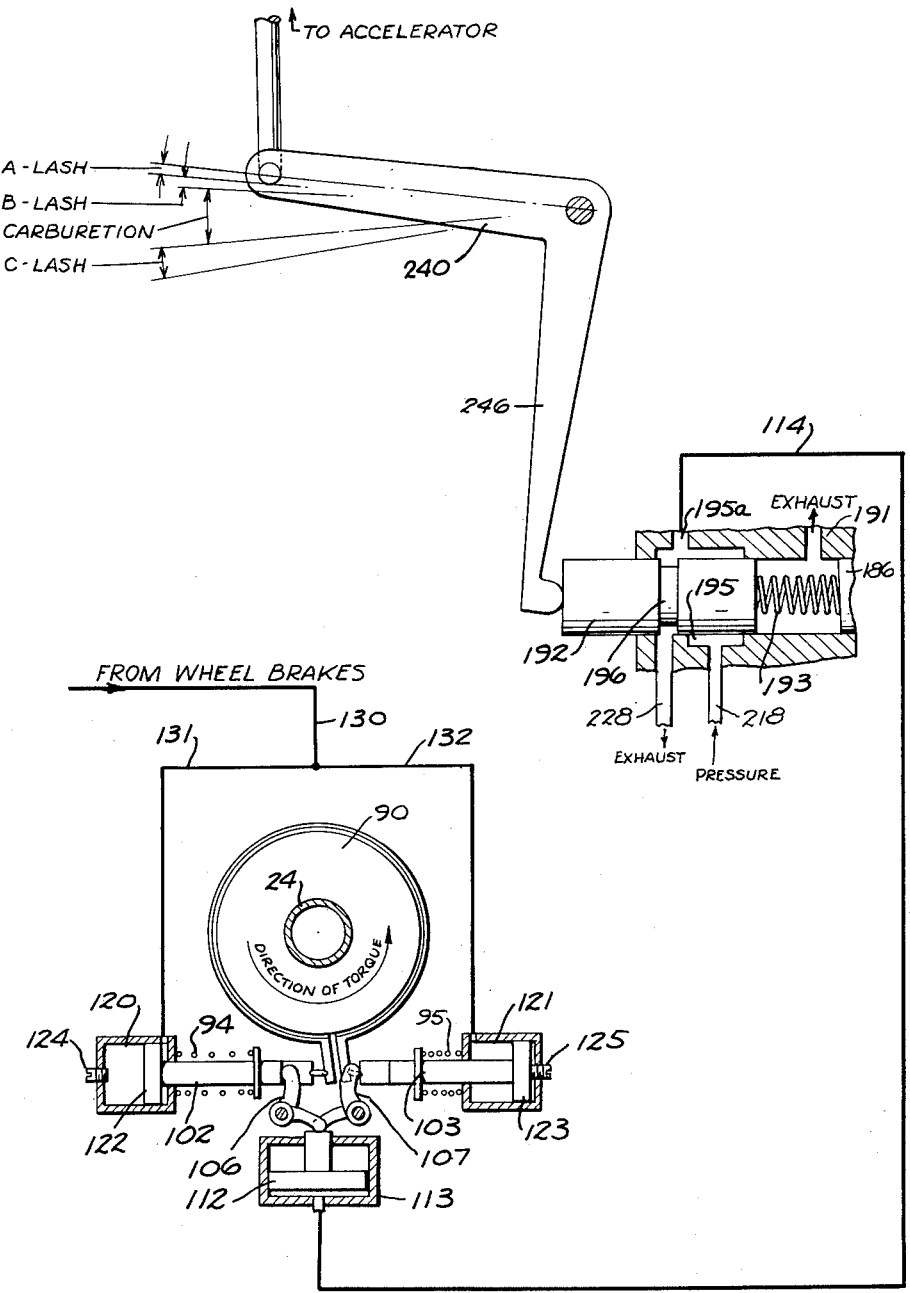
Fig. 3 is a partial diagrammatic view illustrating an accelerator controlled valve for governing flow of hydraulic medium to the anti-creep brake cylinder.

The line 114 is connected to a valve body 191 entering port 195a which is of elongated form. Hydraulic medium under pressure is supplied to the valve through line 218 and port 195. The body has an exhaust line 228. The movable valve member 192 has a port 196 and is acted upon by a spring 193 and is urged against a lever 246, the arm 240 of which is connected to the accelerator or throttle of the engine (Fig. 3). When the accelerator is retracted and the engine is idling, oil under pressure passes through line 218 into port 195 but the port 196 is disaligned from port 195 and is aligned with exhaust line 228 and no oil pressure is transmitted to the anti-creep brake cylinder 113. Therefore, the brake is applied. Upon movement of the accelerator through the A-lash angle the valve 192 is shifted to the right and port 196 is disaligned from the exhaust line 228 and registers with port 195. Oil under pressure now passes into line 114 thus actuating the piston in cylinder 113 and releases the anti-creep brake.

This anti-creep brake arrangement is connected into the hydraulic service brake system of the vehicle. Diagrammatically illustrated in Fig. 2 is a brake pedal 126 of the vehicle which operates a piston in the master cylinder 127 of the hydraulic system and conduits illustrated convey the medium to actuating units 128 for each of the four wheels 129 of the vehicle. Leading from the master cylinder of the brake system is the conduit 130 which has branches 131 and 132 and which respectively connect into the cylinders 120 and 121. Therefore, when the brakes of the vehicle are applied, braking fluid is introduced into the cylinders and the pistons 122 and 123 shifted so as to compress the springs 94 and 95 to release the brake. The detailed manner of this operation and the functions thereof will be later considered.

If the vehicle comes to a stop with the throttle fully retracted, the anti-creep brake cylinder is vented into the line 228 and is thus applied. Accordingly, the vehicle will not creep because of the torque transmitted through the converter. If the engine is stopped, the anti-creep brake serves as a parking brake since the coupler is normally dentally engaged with the gear 46.

The anti-creep brake serves also, as above mentioned, as a gear phaser and a gear torque relief. Suppose the engine is running and the coupler is in neutral and the operator desires to dentally engage the coupler with the gear 46. The teeth 56 and 57 may be so positioned that they abut directly against each other and a dental engagement cannot be made. At this time the anti-creep brake is applied with the cylinder 113 vented. The torque transmitted through the torque converter is transmitted to the brake disc 90 and it may be counter-clockwise as Fig. 2 is viewed. Although the two springs 94 and 95 are of equal strength, the torque thus transmitted to the disc 90 introduces an additional factor. This factor is an exponential one. It is comprised a constant, 2.718, raised to the power determined by the product of the coefficient of friction of the brake band, and the angle of warp of the brake band on the brake disc, expressed in radians. This factor is added to the force of the spring 94 and the combined forces exceed that exerted by spring 95 and, therefore, spring 95 is compressed and the rod 103 abuts against the fixed stop 125. A slight depression of the accelerator treadle through the angle A shifts the valve member 192 and introduces pressure into the cylinder 113 through the line 114. Since the rod 103 of spring 95 is retracted to the right as Fig. 2 is viewed, and the rod 102 is advanced to the right, as Fig. 2 is viewed, the movement of the piston 112 rocks the bell crank lever 106—110 and thus begins to reduce the combined load exerted by spring 94 and the factor introduced by the torque. When this load is reduced to a point where it is less than the force exerted by spring 95, the spring 95 begins to expand. The brake band is still applied to the brake disc and, accordingly, the spring 95 rocks the brake disc 90 through the means of the applied brake band in a clockwise direction. This rocking movement rocks the gear 46 and only a very small movement of the gear 46 is necessary to sufficiently disalign the teeth so that a dental engagement can be made.

Suppose, also, that the vehicle is parked on an incline and the engine is at rest. The anti-creep brake is applied and the coupler is engaged either with the gear 46 or the gear 47. The anti-creep brake is then serving as a parking brake. The tendency of the vehicle to roll one way or another depending upon whether it is heading downhill or uphill and whether the coupler is engaged with the forward gear 46 or reverse gear 47 will transmit torque to the disc 90 and thus one spring, the energizing spring, is aided by the factor introduced by the torque. Assume that the tendency to rock the disc 90 is counter-clockwise as Fig. 2 is viewed. The spring 94 becomes the energizing spring and the spring 95 becomes the reaction spring. Under these circumstances the rod 103 of spring 95 is urged against its stop 125. Now the operator may desire to disengage the coupler from its dental engagement but cannot do so because the torque load on the dentally engaging teeth is high enough to prevent same. Bear in mind that the car is parked and the engine is not running. The operator applies the vehicle brakes by depressing the pedal 126. This introduces the hydraulic pressure of the service brake system to the cylinders 120 and 121. The action of applying the brakes to the wheels of the vehicle freezes the vehicle in position. Since the piston 123 is, at this time, backed up against the stop 125, the piston 122 is shifted to the left thus reducing the force applied to the brake band by the combined action of the spring 94 and the introduced factor, through the rod 102. When the force exerted on the brake band by the combined forces of the spring 94 and the introduced factor is reduced to less than the force exerted by the spring 95, the spring 95 expands, and since the brake band is still applied, the brake disc 90 is rocked in a direction which is reverse to the direction of tendency of rotation due to the torque which was applied thereto. Accordingly the torsional windup in the system is relieved and the teeth may be disengaged.

In both of the instances described above, the spring 94 was considered as the energizing spring and the spring 95 as the reaction spring with the torque applied to the brake disc being counter-clockwise. Since both spring assemblies are identical the same action occurs when torque is applied to the brake disc in the opposite direction, in which case the spring 95 becomes the energizing spring and the spring 94 becomes the reaction spring.

Inasmuch as the two cylinders 120 and 121 are connected in parallel into the service brake system the total capacity of the two cylinders, plus the connecting conduits 131 and 132 is constant and if the two pistons, for example, both move to the left thus ensmalling the cylinder space 121 and enlarging the cylinder space 120, the hydraulic fluid is merely transferred from one cylinder to the other. In normal operations of the vehicle, when the service brakes of the vehicle are applied from time to time there is no effect upon the anti-creep brake because it is normally disengaged at that time.

We claim:

1. In combination with an automatic transmission for the transmission of torque from the engine to the traction wheels of an automotive vehicle, wherein there is torque transmitting means and a fluid coupling positioned between the engine and the torque transmitting means, the fluid coupling having the characteristic of transmitting some torque when the engine is idling, thereby tending to cause the vehicle to creep, of a brake having a braking member secured to the torque transmitting member, a brake band applicable thereto, oppositely acting means normally tending to apply load respectively on opposite ends of the brake band for contracting the same upon the braking member, and means operable to take the load of said oppositely acting means to release the brake band from the braking member.

2. In combination with an automatic transmission for the transmission of torque from the engine to the traction wheels of an automotive vehicle, wherein there is torque transmitting means and a fluid coupling positioned between the engine and the torque transmitting means, the fluid coupling having the characteristic of transmitting some torque when the engine is idling, thereby tending to cause the vehicle to creep, of a brake having a braking member secured to the torque transmitting member, a brake band applicable thereto, said brake band having unanchored ends, oppositely acting means normally active for applying load respectively on the opposite ends of the brake band for contracting the same upon the braking member, and means operable to take the load of said oppositely acting means to release the brake band from the braking member.

3. In combination with an automatic transmission for the transmission of torque from the engine to the traction wheels of an automotive vehicle, wherein there is torque transmitting means and a fluid coupling positioned between the engine and the torque transmitting means, the fluid coupling having the characteristic of transmitting some torque when the engine is idling, thereby tending to cause the vehicle to creep, of throttle means for the engine, a brake having a braking member secured to the torque transmitting member, a brake band applicable thereto, said brake band having unanchored ends, oppositely acting yieldable means for applying load respectively on opposite ends of the brake band for contracting the same upon the braking member, a fixed stop for each yielding means for backing up one yielding means when the torque on said brake member is in a direction so that the forces thereof act on the brake band in the direction of the load of the other yielding means, and means operable upon actuation of the throttle means for accelerating the engine above idling speed to take the load of said oppositely acting means to release the brake band from the braking member.

4. In combination with an automatic transmission for the transmission of torque from the engine to the traction wheels of an automotive vehicle, wherein there is torque transmitting means and a fluid coupling positioned between the engine and the torque transmitting means, the fluid coupling having the characteristic of transmitting some torque when the engine is idling, thereby tending to cause the vehicle to creep, of a throttle for the engine, a brake having a braking member secured to the torque transmitting member, a brake band applicable thereto having unanchored ends, oppositely acting yieldable means for applying load respectively on opposite ends of the brake band for contracting the same upon the braking member, said oppositely acting means applying substantial equal loads to the ends of the brake band and normally applying the brake band to said brake member, and means operable upon actuation of the throttle to accelerate the engine above idling speed for driving the vehicle to release the brake band from the braking member.

5. A brake structure for an automotive vehicle having a fluid coupling and a torque transmitting member for holding the vehicle against creeping action when the engine thereof is idling and for other purposes comprising, a brake member secured to the torque transmitting member, a brake band having unanchored ends, yieldable means normally active for applying load respectively on opposite ends of the brake band and in opposite directions for contracting the same upon the brake member, and means operable to take the load of said yieldable means to release the brake band from said braking member.

6. A brake structure for an automotive vehicle having a fluid coupling and a torque transmitting member for holding the vehicle against creeping action when the engine thereof is idling and for other purposes comprising, a brake member secured to the torque transmitting member, a brake band having unanchored ends, a pair of springs acting oppositely on the ends of the brake band to load the same and to contract the brake band on the brake member, said springs loading the brake ends substantially equally, one spring being adapted to be compressed to provide reaction for the other spring when the torque on the brake member is in a direction such as to aid the action of said other spring, a fixed stop for limiting the compression of said one spring, and means operable for taking the loads of the two springs to release the brake band from the brake member.

7. A brake structure for an automotive vehicle having a fluid coupling and a torque transmitting member for holding the vehicle against creeping action when the engine thereof is idling and for other purposes comprising, an engine throttle, a brake member secured to the torque transmitting member, a brake band having unanchored ends, a pair of springs acting oppositely on the ends of the brake band to load the same and to contract the brake band on the brake member, said springs loading the brake ends substantially equally, one spring being adapted to be compressed to provide reaction for the other spring when the torque on the brake member is in a direction such as to aid the action of said other spring, a fixed stop for limiting the compression of said one spring, and means operable by the throttle when the engine of the vehicle is accelerated to drive the vehicle for taking the loads of the two springs to release the brake band from the brake member.

8. A brake structure for an automotive vehicle having a fluid coupling and a torque transmitting member for holding the vehicle against creeping action when the engine thereof is idling and for other purposes comprising, an engine throttle, a brake member secured to the torque transmitting member, a brake band having unanchored ends, a pair of oppositely acting springs for acting upon the ends of the brake band in opposite directions to apply the band to the brake member, a rod associated with each spring, a fixed stop for each rod, whereby when the torque on the brake member tends to turn the brake band in a direction such as to aid the load of one spring, the rod of the other spring may back up against its fixed stop by compression of said other spring to resist the applied load of the first spring plus the torque, and means operable by the throttle when the engine of the vehicle is accelerated to drive the vehicle to take the load of the springs and release the brake band from the braking member.

9. The brake structure as described in claim 8 characterized in that the means for taking the load of the springs includes a bell crank lever associated with each of said rods and an actuating member movable when the engine is accelerated as stated for rocking the bell crank levers.

10. In an automotive vehicle having a transmission for transmitting torque from the engine to the traction wheels thereof of the type which transmits some torque when the engine is idling with resultant tendency of the vehicle to creep, an anti-creep brake applicable to a transmission part when the engine is idling to check the creeping action, means operable to release the brake for normal vehicle operation, said vehicle having a braking system for its ground engaging wheels, and a connection between the braking system and the means for releasing the anti-creep brake for the release of the anti-creep brake upon the application of the brakes of the ground engaging wheels.

11. In an automotive vehicle having a transmission for transmitting torque from the engine to the traction wheels thereof of the type which transmits some torque when the engine is idling with resultant tendency of the vehicle to creep, an anti-creep brake applicable to a transmission part when the engine is idling to check the creeping action, means operable to release the brake for normal vehicle operation, said vehicle having a hydraulic braking system for applying the brakes of its ground engaging wheels, a chamber connected into the hydraulic braking system for receiving hydraulic medium of the said braking system and having a movable element for actuating the anti-creep brake to release it, whereby upon application of the brakes of the ground engaging wheels of the vehicle the pressure in the hydraulic system is effective to release the anti-creep brake.

12. In an automotive vehicle having means for transmitting torque from the engine thereof to the traction wheels thereof, and having a hydraulic braking system for its ground engaging wheels, an anti-creep brake applicable to a torque transmitting part for preventing creep of the vehicle when the engine is idling, means for releasing the anti-creep brake for normal vehicle operation, a hydraulically actuated element which is movable to release the anti-creep brake, and means for conducting the hydraulic fluid of the vehicle's hydraulic brake system to said element whereby upon application of the vehicle brakes, when the vehicle is at rest, the pressure in the hydraulic brake system releases the anti-creep brake to thereby free the transmission part engaged by the anti-creep brake.

13. In an automotive vehicle having a transmission for transmitting torque from the engine to the traction wheels thereof of the type which transmits some torque when the engine is idling with resultant tendency of the vehicle to creep, and having a hydraulic service braking system for its wheels, and an anti-creep brake applicable to a torque transmitting member to prevent creep of the vehicle when the engine is idling, hydraulically actuated means for releasing the anti-creep brake, and connections between the service braking system of the vehicle and the hydraulically actuated means for conducting the fluid of the hydraulic service braking system to said hydraulically actuated means, whereby the anti-creep brake may be released from said torque transmitting member upon the application of the vehicle service brakes.

14. In an automotive vehicle having a transmission for transmitting torque from the engine to the traction wheels thereof of the type which transmits some torque when the engine is idling with resultant tendency of the vehicle to creep, a throttle for the engine, an anti-creep brake applicable to a torque transmitting member to prevent creep of the vehicle when the engine is idling, said brake including oppositely acting springs for applying the same, a piston in a cylinder associated with each spring, the vehicle having a hydraulic brake system for its wheels, means for conducting the fluid of the hydraulic brake system to said cylinders, whereby upon application of the vehicle brakes, the hydraulic fluid thereof is introduced into the cylinders to thereby take the load exerted by the springs to release the anti-creep brake, and other means operable by the throttle for taking the load of the springs to release the anti-creep brake when the engine of the vehicle is accelerated to drive the vehicle.

15. In combination with an automotive vehicle having a hydraulic service braking system for its wheels and having a transmission of the type which transmits some torque when the engine is idling with resultant tendency of the vehicle to creep, a torque transmitting member, an anti-creep brake applicable to the torque transmitting member to check the creeping action when the engine is idling, hydraulically actuated means for releasing the anti-creep brake, and connections between the service braking system of the vehicle and the hydraulically actuated means for conducting the hydraulic brake fluid of the service braking system to said hydraulically actuated means, whereby the anti-creep brake may be released from said torque transmitting member upon application of the vehicle service brakes.

References Cited in the file of this patent

UNITED STATES PATENTS

| | | |
|---|---|---|
| 2,247,714 | Peterson et al. | July 1, 1941 |
| 2,475,679 | Sinclair | July 12, 1949 |
| 2,482,573 | Banker | Sept. 20, 1949 |